Feb. 28, 1956 T. S. HARRER 2,736,550
ORE ROASTING APPARATUS
Original Filed March 19, 1952 7 Sheets-Sheet 2

FIG.2.

INVENTOR.
THEODORE S. HARRER
BY
ATTORNEY.

FIG. 3.

INVENTOR.
THEODORE S. HARRER
BY
Joseph A. Ryan
ATTORNEY.

Feb. 28, 1956 T. S. HARRER 2,736,550
ORE ROASTING APPARATUS
Original Filed March 19, 1952 7 Sheets-Sheet 5

INVENTOR.
THEODORE S. HARRER
BY
*Joseph A. Ryan*
ATTORNEY.

Feb. 28, 1956     T. S. HARRER     2,736,550
ORE ROASTING APPARATUS
Original Filed March 19, 1952     7 Sheets-Sheet 6

INVENTOR.
THEODORE S. HARRER
BY
ATTORNEY.

United States Patent Office 2,736,550
Patented Feb. 28, 1956

2,736,550

ORE ROASTING APPARATUS

Theodore S. Harrer, Stratford, N. J., assignor to Allied Chemical & Dye Corporation, New York, N. Y., a corporation of New York Original application March 19, 1952, Serial No. 277,368. Divided and this application October 18, 1954, Serial No. 462,787

10 Claims. (Cl. 266—31)

This invention relates to metallurgy. More particularly the present improvements are directed to roasting of comminuted sulfide ore and especially apparatus for suspension burning or roasting of finely divided metal sulfides such as pyrites. This application is a division of my copending application Serial No. 277,368, filed March 19, 1952, and directed particularly to process.

A general object of the invention comprises the provision of roasting methods and apparatus which facilitate marked increase of output per unit of apparatus as compared with previous operations in this art. The nature of the invention, the objects and advantages thereof may be fully understood from the following description taken in connection with the accompanying drawing, in which.

Figure 1:
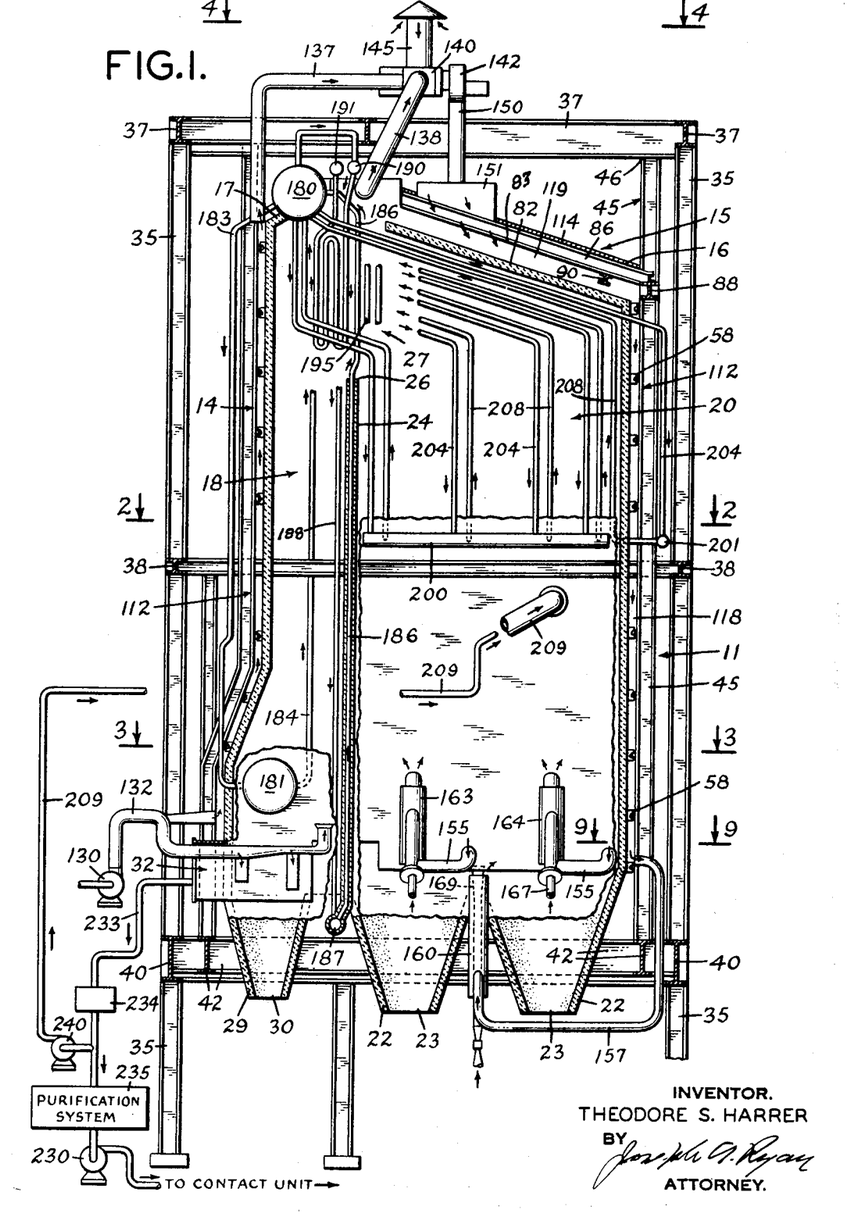
Fig. 1 is a side view, partly in vertical section and partly in elevation, the latter being taken approximately on lines 1—1 of Figs. 2, 3 and 4.
Figure 2:
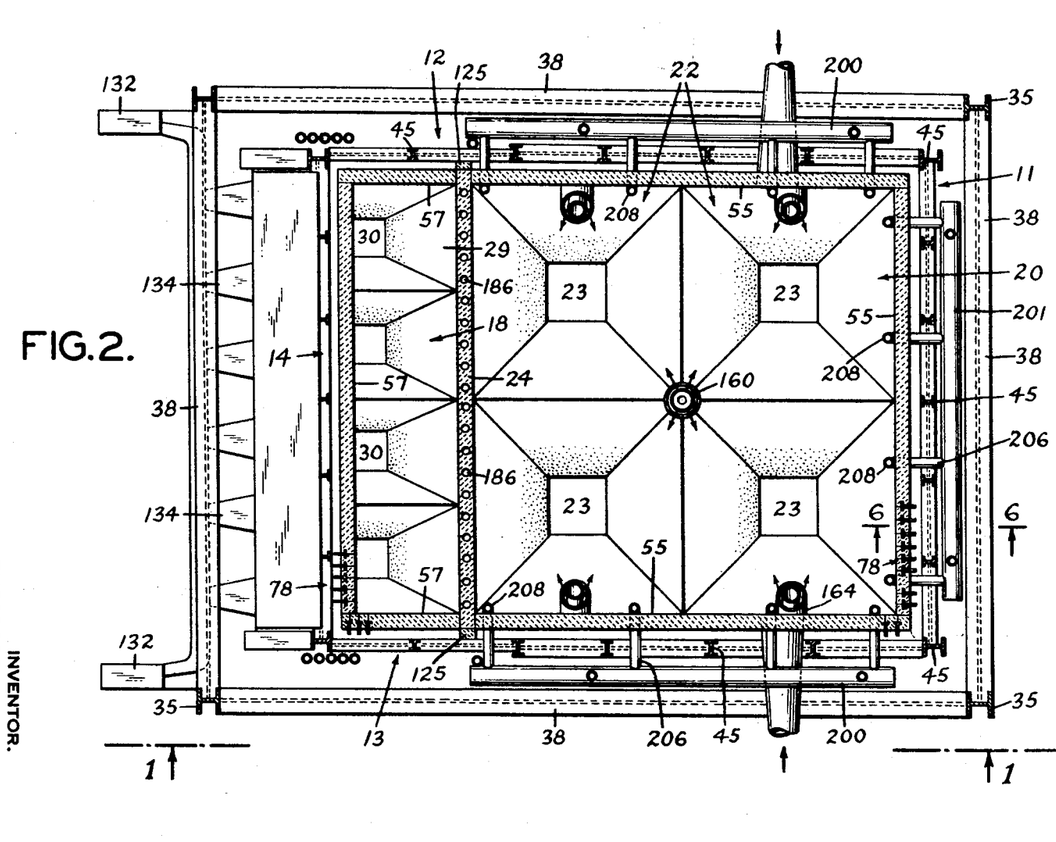
Fig. 2 is a horizontal section taken approximately on the line 2—2 of Fig. 1.
Figure 3:
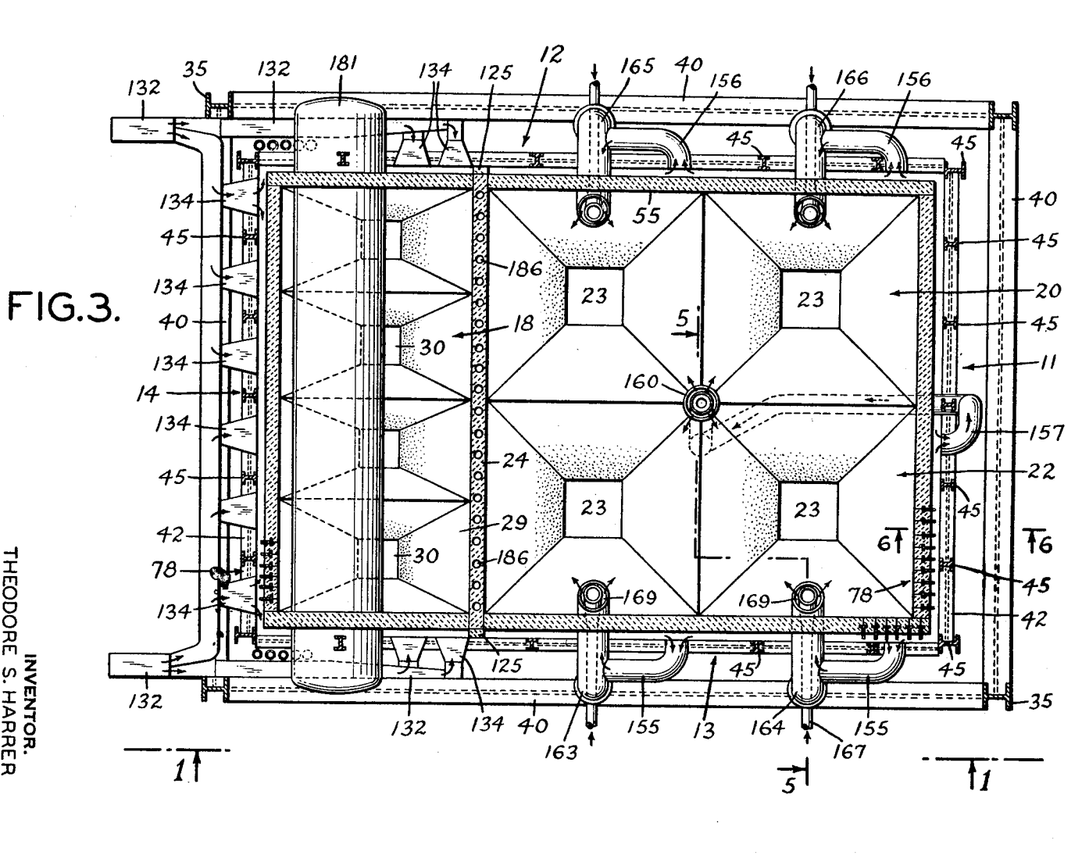
Fig. 3 is a horizontal section taken approximately on the line 3—3 of Fig. 1.

The burner of the invention generally comprises front wall 11, side walls 12 and 13, back wall 14 and roof 15. The front, back and side walls form a unitary structure which is rectangular in horizontal section as shown in Figs. 2 and 3, and is vertically elongated as indicated by Fig. 1. The rear of the burner is occupied by a vertically elongated boiler section 18 of rectangular horizontal cross-section, while the front portion of the burner constitutes a combustion chamber 20 which is substantially square in horizontal section as shown in Figs. 2 and 3 and has a vertical length preferably more than twice the horizontal dimension. Each section 16 and 17 of roof 15 is planar and slopes at a substantial angle from a transverse ridge downwardly toward walls 11 and 14 respectively thus forming an outer top for each of boiler section 18 and chamber 20. At the bottom the combustion chamber 20 is provided with four inverted pyramidal or cone-like hopper-bottom cinder hearths 22 and associated air inlet-cinder outlet ports 23, seen in vertical section in Fig. 1 and in plan in Figs. 2 and 3. The ports 23 are of substantial horizontal area, and in usual operation are maintained wide open, although such ports are provided preferably with slide gates not shown by means of which the areas of these openings may be regulated to control inflow of air into the bottom of the combustion chamber.

Combustion zone 20 is separated from the boiler section 18 by a transverse fire wall 24 extending upwardly from approximately the level of the bases of the walls 11, 12, 13 and 14 to an elevation 26, Fig. 1, which is considerably below the extreme top of the combustion chamber. Thus, there is provided at the back and top of the combustion chamber a gas outlet 27 leading into the top of the boiler section which outlet extends the entire width of the structure and is formed by a break or breach in the fire wall extending from the elevation at 26, Fig. 1, to the underside of the roof ridge. The bottom of the boiler section is equipped with four inverted pyramidal or cone-like hopper-bottom cinder and dust collecting hearths 29 appearing in vertical section in Fig. 1 and in plan in Figs. 2 and 3. Outlets 30 of hearths 29 may be provided with any suitable type of air-lock which facilitates discharge of cinder or dust without ingress of air or egress of gas. Gas leaves the bottom of the boiler section 18 through a conduit 32 which is rectangular in elevation and extends substantially the entire width of the lower end of the rear wall 14.

One aspect of the invention includes suspension roaster wall construction by means of which incremental parts of the burner walls and roof are separately supported in such manner that the four vertical walls and the roof may be said to be of suspended construction, i. e. the weight of any incremental part of the wall or roof is individually supported so that no substantial portion of any part of a vertical outside wall or the roof depends upon an adjacent or subjacent part of the wall or roof for support. These features contribute largely to an over-all development which has evolved construction and mode of operation of a burner which is much larger and has much greater capacity than any fines roasters known in the art.

Figure 4:
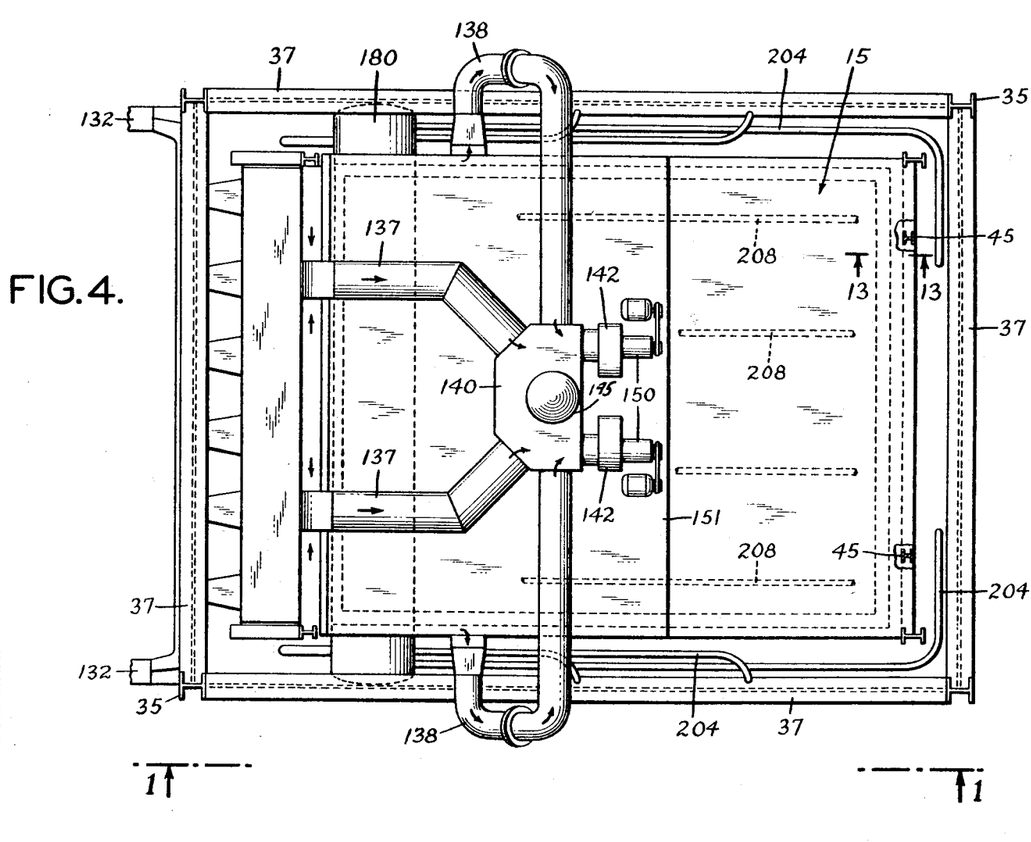
Fig. 4 is a top plan view taken approximately on the line 4—4 of Fig. 1.

A weight supporting gallows frame comprises principally four heavy vertically disposed I-beams 35 connected at their upper ends by horizontal top I-beams 37, Figs. 1 and 4, and also by horizontal intermediate connecting I-beams 38, Figs. 1 and 2. Also, connected to and carried by the verticals 35 are principal horizontally disposed weight supporting main sills 40, Figs. 1, 3 and 5. Sills 40 in turn are attached to and maintained in position by horizontally disposed supplemental sills 42 one of which is shown in elevation in Fig. 1 and another in vertical section in Fig. 5, supplemental sills 42 bearing to main sills 40 the horizontal plan relationship indicated diagrammatically in Fig. 12. Welded at their lower ends to the upper flanges of supplemental sills 42 are a plurality of vertically disposed secondary I-beams 45 the upper ends of which are attached as indicated at 46, Fig. 1, to framework which is connected to upper horizontals 37 and which appears in plan similar to supplemental sills 42 of Fig. 12. On inspection of Figs. 2 and 3, showing secondary verticals 45 in horizontal cross-section, it will be understood that these verticals are arranged in spaced relation about the entire perimeter of the structure. Thus, as illustrated in Fig. 3, the front wall of the burner includes two corner secondary verticals 45 and five intermediate and equally spaced apart verticals 45, the relationship between the lower ends of verticals 45 and the underlying supporting supplemental sills 42 being shown at 50 in Fig. 5.

The refractory brick front and side walls 55 of the combustion chamber and the refractory brick side and back walls 57 of the boiler section 18 are shown in horizontal section in Fig. 2. The burner construction afforded by the invention is such that these walls are supported by the steel cage-like framework above described so that substantially each incremental portion of the refractory walls of the combustion chamber and of the boiler section is independently supported, the particular specific construction exemplified herein being illustrated more particularly in the enlargements of Figs. 6–10.

Figure 6:
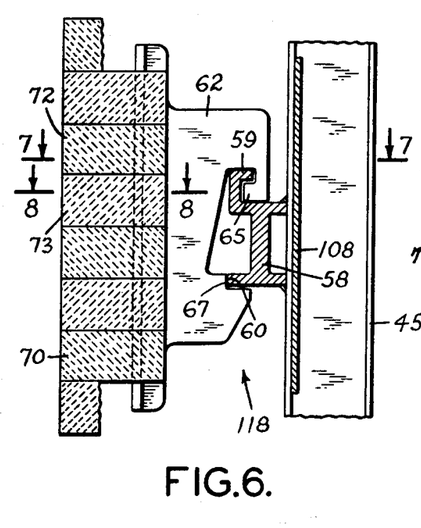
Fig. 6 is a vertical section on lines 6—6 of Figs. 2 and 3 showing an enlarged detail of wall construction.
Figure 7:
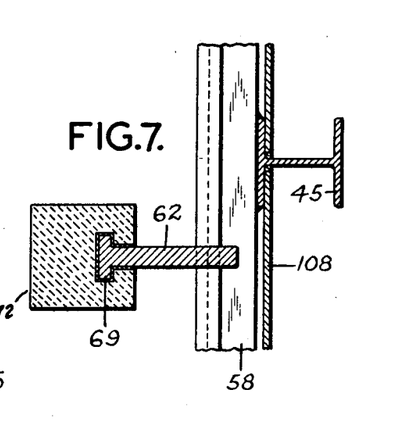
Fig. 7 is a horizontal section on line 7—7 of Fig. 6.
Figure 8:
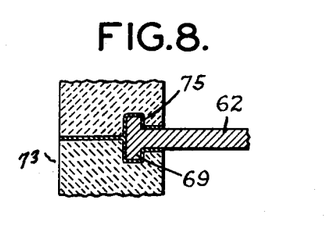
Fig. 8 is a horizontal section on line 8—8 of Fig. 6.

Fig. 6, a representative vertical wall section such as taken on the lines 6—6 of Figs. 2 and 3, shows a secondary vertical I-beam 45 in elevation, and Fig. 7 indicates the same beam 45 in horizontal cross-section. Welded to the inner vertical face of beam 45 is a bracket rod 58 shaped in vertical cross-section as shown in Fig. 6 to provide an upper hook 59 and a lower butting stop 60. Rod 58 is sufficiently elongated to extend horizontally across the entire front wall 11 of the burner, and is welded to the inner face of each contiguous vertical 45. Several such rods 58 are spaced apart vertically as indicated diagrammatically in front wall 11 of Fig. 1, vertical spacing being say 24 to 30 inches. Associated with each bracket rod is a multiplicity of brackets 62 one of which appears in elevation as in Fig. 6, and in horizontal section in Figs. 7 and 8. Each bracket includes a hook 65 to engage over the oppositely disposed hook 59 of rod 58, and also a shoulder 67 which butts against the stop 60 of rod 58. The outer vertical edge of each bracket is formed T-shaped as shown at 69 in Fig. 7. The vertical length of the T-shaped edge of bracket 62 may be equivalent to the vertical thickness of say seven refractory bricks 70, and may correspond approximately with the vertical spacing between rods 58. The bricks of e. g. course 72 are formed with a centrally positioned T-shaped slot as indicated in Fig. 7, while the bricks of a lower course 73 may be provided with oppositely disposed half-slots as at 75, Fig. 8, adjacent half-slots forming the equivalent of the full-slot of Fig. 7. This arrangement permits adjacent courses 72 and 73 to be laid in staggered vertical relation. It will be seen that when bricks of a given course are slipped down over the T-shaped edge of a bracket 62 and cemented in place, each brick receives, in effect, cantilever-like support thru bracket 62 and bracket rod 58 from secondary vertical 45. The horizontally adjacent space relation of bracket 62 is indicated diagrammatically at 78 in Figs. 2 and 3. Thus, substantially each brick of any course is independently supported by verticals 45, and it will be seen that the result of such construction is that the height or area of a given wall can be extended indefinitely without regard to the size limitations imposed when brick walls, particularly of refractory material, are built in accordance with self-supporting principles.

Figure 13:
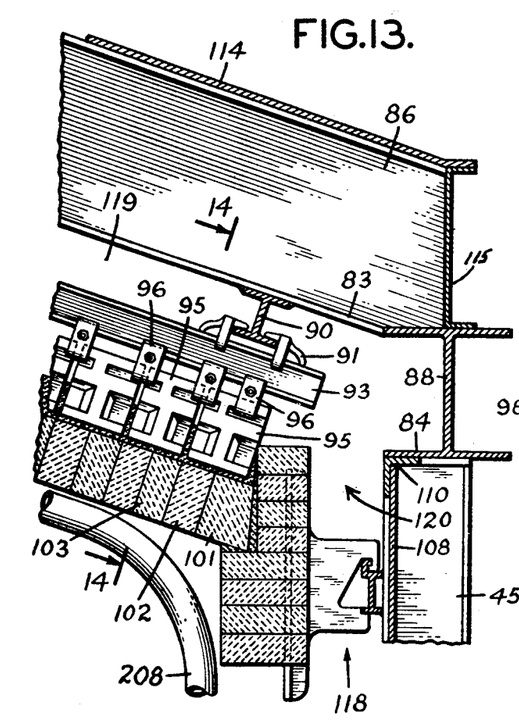
Fig. 13 is an enlarged vertical section of a detail taken approximately on the line 13—13 of Fig. 4.
Figure 14:
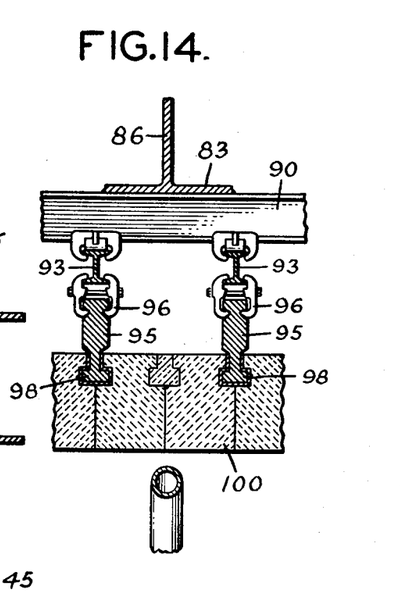
Fig. 14 is an enlarged vertical section of a detail taken approximately on the line 14—14 of Fig. 13.

The bricks constituting the refractory roof 82, Fig. 1, forming the tops or crowns of the combustion chamber and boiler section 18 are also individually suspended and supported in a manner similar to the wall construction above described. In Fig. 13, 83 and 84 indicate respectively the lower flanges of a main roof beam 86 and the vertical web of a horizontal I-beam 88 of Fig. 1. Referring to Fig. 13, welded to the under face of a flange 83 is a series of horizontally disposed transverse I-beams 90 to the lower flanges of which, by clamps indicated at 91, are attached a series of smaller sloping and longitudinally disposed I-beams 93 indicated in elevation in Fig. 13 and in vertical section in Fig. 14. As shown in Fig. 14, each of a series of brackets 95 is attached at the upper end by clamps 96 to the under flange of the sloping beams 93. The lower end of each bracket 95 is formed T-shaped as at 98 similarly to the T-shaped ends of brackets 62 of Fig. 6. Individual bricks 100 are half-slotted as in Fig. 14 to register with the T on the lower end of each bracket. In assembling the roof structure, courses 101, 102, and 103 are put in place in the order named, and from Figs. 13 and 14 and the foregoing description it will be understood that substantially each roof brick is suspended from and individually supported by the framework including I-beams 86, 90 and 93.

Figure 9:
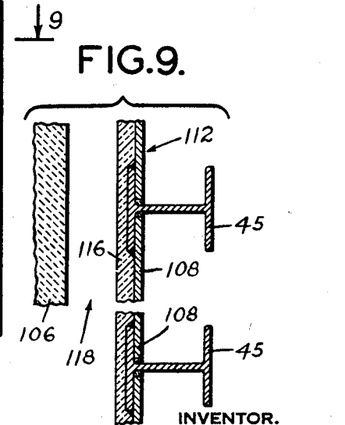
Fig. 9 is a horizontal section on line 9—9 of Fig. 10 showing an enlarged detail of wall construction.
Figure 10:
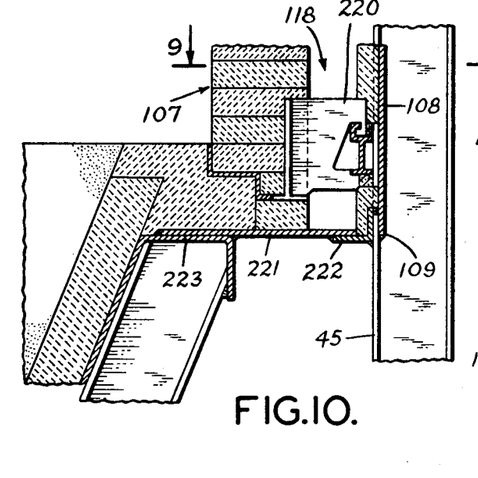
Fig. 10 is a vertical section showing an enlargement of a part of the vertical sectional portion of Fig. 5.

Upwardly from about the level of the upper edges of the hearths 22 and 29, the brickwork of the entire burner structure—including the front and side walls of the combustion chamber, the back and side walls of the boiler section, and the brickwork top of the combustion chamber and boiler section—is covered by a hood. This hood comprises a sheet steel shell spaced outwardly from the outer surface of the brickwork walls and burner top. The relationship of the vertical portions of the shell to the vertical brickwork walls is best shown in the enlargements of Figs. 9 and 10. Fig. 9 shows two secondary I-beam verticals 45 and a portion 106 of the brickwork 107, these features being indicated also in the vertical section of Fig. 10 which is an enlargement of a sectional portion of Fig. 5 and an enlargement of part of a vertical section taken on the line 5—5 of Fig. 3. As seen in Fig. 9, the opposite vertical edges of vertically elongated and disposed plates 108 of sheet steel are welded to the outer faces of the inner flanges of adjacent verticals 45. A plate 108 usually extends the entire length of the vertical wall from about 109, Fig. 10, at the lower end of a side wall to the top of such wall, e. g. as at 110, Fig. 13. Hence, from Fig. 9, it will be understood that the plurality of plates 108 interposed between all of the verticals 45 spaced about the periphery of the entire structure affords a steel shell, designated generally by 112, Fig. 1, which completely encloses the front and side walls of the combustion chamber and the back and side walls of the boiler space. Shell 112 is continued over the tops of the combustion chamber and the boiler section in the form of sheet steel plates 114, indicated in Fig. 13 and near the top of Fig. 1, which plates rest on and are welded to the upper flanges of roof beams 86. It will be understood that sheeting 114 is arranged on the associated supporting beams 86 so as to completely cover the brickwork of the top of each of the combustion chamber and the boiler section, and it will be further understood that the eave edges of sheeting 114 are welded to the upper edges of a channel beam 115 so as to form a gas-tight eaves line connection with the upper ends of shell 112. Hence it will be seen that shell 112 and roof sheeting 114 together form a hood which externally surrounds the brickwork of the sides and top of the entire structure. On its inner side, shell 112 is provided with a layer of adherent insulating material 116, the underside of roof plates 114, Fig. 1, being similarly provided with a layer of insulating material not shown.

It will be noted from Figs. 6 and 10 that the wall structure design is such as to provide a space 118 of substantial lateral or horizontal dimension between the inner face of insulating material 116, and the outer face of brickwork 106 of e. g. Fig. 9. Also, it will be observed that the space 119, Figs. 1 and 13, between the upper face of the top brickwork and the under face of the insulation attached to the underside of the roof sheeting 114 is open. The gas space at the eaves level of the roof communicates freely with the upper end of the gas space 118 as indicated at 120, Fig. 13. Thus, spaces 118 and 119 provide for a gas envelope completely surrounding the sides and top of the entire structure. The gas envelope on burner sides 12 and 13 is interrupted by vertical partitions 125, Fig. 2, which lie in about the same vertical plane as the firewall 24 and extend vertically from the bottom of the hood to the eaves line.

For purposes which will hereafter appear, non-corrosive blanket gas, which in the embodiment described is preferably air which may be used also as secondary air in the roasting operation, is pumped by blower 130, Fig. 1, into headers 132 communicating through connectors 134, Fig. 3, with the bottom of that portion of the gas envelope surrounding the sides and back of the boiler section 18. This air flows upwardly between the brickwork back and side walls of the boiler section, the partions 125 and the adjacent walls of the hood. At the top of the structure such air leaves the boiler section portion of the envelope through pipes 137 and 138 and is fed into a chamber 140 communicating with the inlet sides of blowers 142 and with the atmosphere through an inlet 145, Figs. 1 and 4. Blowers 142 take all the air from pipes 137 and 138 and additional air from the atmosphere through inlet 145 and force the same through pipes 150 into a distributing chamber 151 which, as shown particularly in Figs. 1 and 4, extends across the entire width of the roof of the chamber 18. As indicated in the upper part of Fig. 1, the underside of distributing chamber 151 opens into the upper end of the gas space 119 which in turn is in free gas communication with that portion of the gas envelope surrounding the vertical front and side walls of the combustion chamber. This air stream flows over the top of the brickwork forming the combustion chamber crown and then downwardly between the inner face of the front and side walls of the chamber, the partitions 125, and the adjacent inner face of the steel shell. The air, if to be used as secondary air in roasting, then is forced out of the lower end of space 118 into outlet pipes 155, 156, and 157, Fig. 3.

Figure 11:
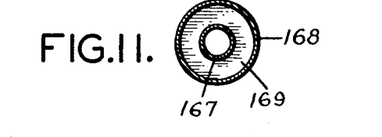
Fig. 11 is an enlarged transverse section taken on line 11—11 of Fig. 5.

In one modification of the invention, the combustion chamber is provided at the bottom, at a horizon approximating the upper edge of the cinder cones, with five ore injectors. One injector 160, Figs. 1 and 3, is vertically directed and is positioned in the center of a horizontal cross-section of the combustion chamber. Each side of the combustion chamber is provided with two inwardly and upwardly directed injectors, namely, 163, 164, 165 and 166, Figs. 2, 3 and 5, one side injector 164 being shown in elevation in the section of Fig. 5. Each side injector comprises an ore-air injector tube 167 the inner end of which is surrounded by a concentric sleeve 168 arranged so as to provide between the outside of the injector tube and the inner surface of the sleeve an elongated annular air passage 169, Fig. 11, closed at the lower end and in open communication at the upper end with the interior of the combustion chamber.

Figures 5, 12:
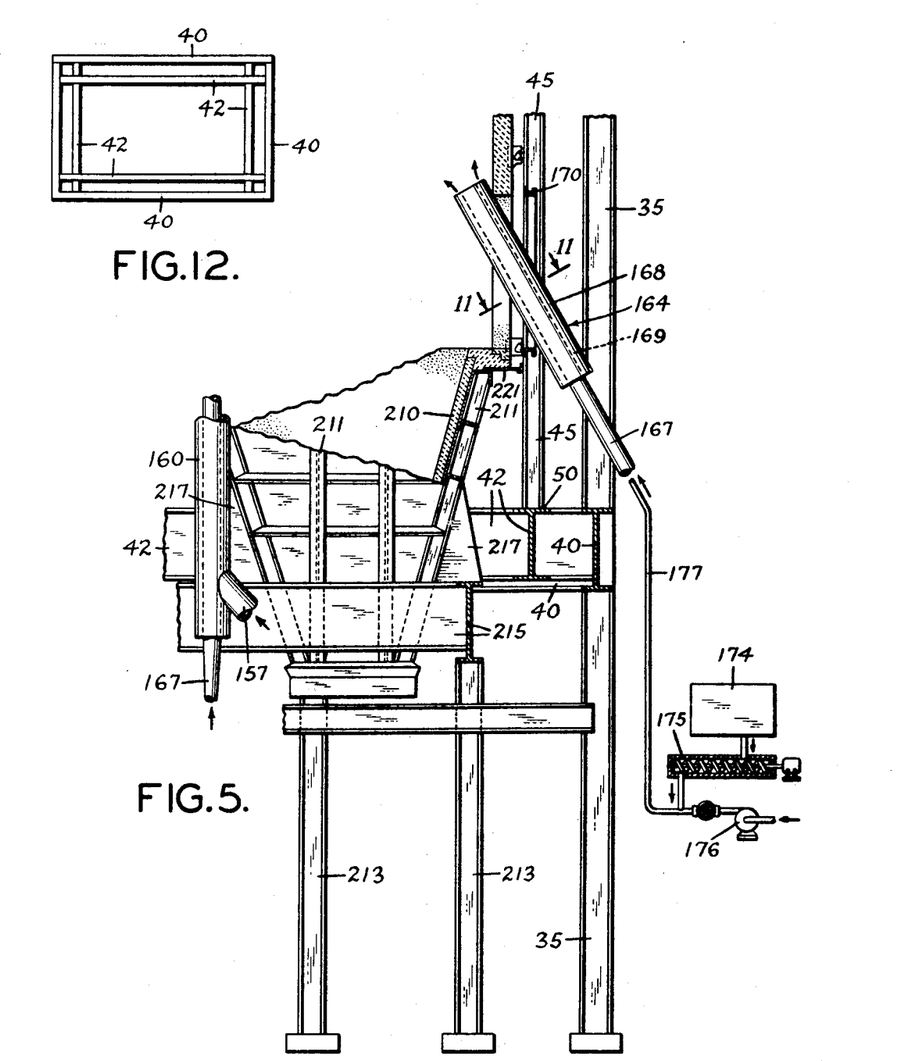
Fig. 5 is a view, partly in vertical section and partly in elevation, taken approximately on the line 5—5 of Fig. 3.
Fig. 12 is a diagrammatic plan of a detail.

In the embodiment illustrated in Fig. 5, a side injector projects through a port at the base of the combustion chamber side wall. Each side injector sleeve 168 is connected to a circular flange 170 by means of a universal ball joint not shown so that the axis of each injector is adjustable both vertically and horizontally. The general design of center injector 160, Fig. 1, is about the same as that of the side injectors except that injector 160 which may be movable and adjustable axially is usually not angularly adjustable with respect to the vertical. The annular gas passage 169 of each injector is supplied with secondary air discharged from the bottom of the gas space surrounding the brickwork of the front and sides of the combustion chamber. Thus, in Fig. 3, connecting pipes 155 open into the annular passages 169 of injectors 163 and 164, and connecting pipes 156 open into the lower end of the annular spaces 169 of opposite side injectors 165 and 166. Further, the secondary air outlet pipe 157, Figs. 3 and 1, at the base of the gas space on the front side of the combustion chamber, opens into the bottom of the annular space 169 of center injector 160.

Fig. 5 shows diagrammatically an ore bin 174, a screw conveyor 175 and a blower 176 which function as known in the art to form a suspension of sulfide fines in what is termed herein as tertiary air. This suspension is swept through suitable pipe connections such as 177 into the outer end of the ore-air conduit of each of the five injectors.

The waste heat boiler assembly and certain arrangement of water tubes in the combustion zone are best shown in Fig. 1. The boiler includes a top water-steam drum 180 and a lower mud drum 181 connected by banks of downcomers 183 disposed mostly outside the structure and by banks of vertical upcomers 184 lying within the boiler section 18 in the path of outgoing hot gases. As indicated in vertical section in Fig. 1 and in horizontal section in Figs. 2 and 3, the fire wall 24 is principally protected from overheating and partly strengthened structurally by embedded upcomer water tubes 186. The bottom ends of these upcomers are connected to an independent lower drum 187, Fig. 1, which is supplied from the main upper drum 180 by downcomers 188, lying externally of the sides of the structure. The upper portions of upcomers 186 project out of the upper horizontal edge of the fire wall and extend vertically in grate-like fashion across the breach affording gas communication between the top of the combustion chamber and the top of the boiler section, the top ends of upcomers 186 being connected to the main upper drum 180. Steam from the latter flows into the steam inlet header 190, Fig. 1, of a superheater, then through banks of superheater tubes lying directly in the combustion chamber gas outlet, and thence to a superheater steam outlet header 191 from which superheated steam is conducted to a point of use. On the combustion chamber side of the superheater tubes there is provided a bank of vertically disposed upcomer tubes, indicated at 195, Fig. 1, opening at their lower ends into the mud drum 181 and at their upper ends into main drum 180. This latter bank of upcomers serves as a shield for the superheater tubes and effects substantial cooling of the hot gas leaving the combustion chamber before such gas hits the superheater tubes which contain only steam.

In accordance with another feature of the present improvements, the roasting process of the invention embodies temperature control in the combustion chamber partly by means of water tubes mounted within the upper end of the combustion zone. The sides and front of the combustion chamber are equipped with external horizontally extending water inlet headers 200 and 201 lying in a horizontal plane positioned vertically about a half or third of the way down from the top of the combustion zone. These inlet headers are supplied with water by downcomers 204 connected to the upper drum and lying outside the structure. Headers 200 and 201 communicate through horizontally extending stub connectors 206, Fig. 2, with the bottom ends of upcomer tubes 208 which in effect line the inside of the roof and the upper portions of the front and sides of the combustion chamber with water tubes, such tubes being connected at their upper ends to the main drum 180. The arrangement of these water tubes lying within the upper end of the combustion zone will be understood from inspection of Figs. 1, 2 and 4. To further facilitate flexibility of combustion temperature control, a conduit 209, Fig. 1, opens at one end into about the vertical mid-portion of the combustion chamber, the opposite end of such conduit being connected to the furnace gas outlet as will be discussed further. The structure described includes five circulatory systems—namely, the main boiler tubes 184, the fire wall tubes 186, the superheater tubes, the superheater shield tubes 195, and the combustion zone upcomer tubes 208.

As described above, the vertical walls and roof of the burner are supported from the gallows frame and the associated steelwork. In accordance with another feature of the invention, for purposes that will hereafter appear, construction of the burner is such that the cinder hearths 22 and all associated structure lying below the horizon of the lower ends of the vertical combustion chamber walls are supported wholly independently of the vertical walls. Fig. 5 shows that the refractory lining 210 and the supporting web-like steelwork 211 are held in position by separate framing, including columns 213, I-beams 215 and webbing 217, which takes the entire weight of the cinder hearths, it being noted that columns 213 are high enough to permit running large cinder dump cars or other commercial size conveying equipment underneath hearth outlets 23. The weight of the lower end of a vertical wall is taken by verticals 45 through brackets 220, Fig. 10, similar to brackets 62 of Fig. 6. The present improvements comprise a construction in which the vertical walls and the cinder hearths are independently supported using any suitable type of refractory gas-tight joint at the junction of the lower ends of the vertical walls and the upper outer edges of the cinder hearths, such a joint being illustrated in the enlargement of Fig. 10. Steel plate 221 bridges the gap between the horizontal face of angle iron 222 and the upper rim 223 of the sheet steel portion of the cinder hearth framework. The space above plate 221 and the under edge of the bricks constituting the lower end of the vertical wall is grouted or bricked in any suitable way to afford a gas-tight joint, it being apparent that such a joint has no substantial inherent structural strength and functions only as a seal. If desired, the same construction may be utilized in connection with the cinder hearths 29.

The process of the invention is carried out preferably in a vertically elongated chamber, i. e. a roasting zone having a maximum horizontal dimension less than the overall height as taken from the combustion zone crown 82 to the air inlet-cinder outlets 23. Preferably, maximum horizontal dimension is substantially less than the height and does not exceed about two-thirds of the vertical length of the combustion zone. Satisfactory combustion zone dimensions may approximate the proportions indicated in Fig. 1 in which the average vertical height of the combustion zone is between two and three times the horizontal dimension of a side wall.

As indicated, this invention relates to the suspension roasting procedure in which the fines and the air needed for oxidation are charged into the bottom and the product $SO_2$ gas is withdrawn from the top of a vertically elongated roasting zone. Theoretically an operation of this type is carried out with minus pressures in the roasting zone (such minus pressures being induced by the suction fans in the main gas line between the gas purification system and the contact unit of a sulfuric acid plant as known in the art). However, experience has shown that when practically balanced to slightly negative pressure is maintained at the air inlet-cinder outlet (e. g. 23, Fig. 1) because of inherent peculiarities, probably created by a "chimney effect," appreciable plus pressures are developed in the top of the roasting zone and may extend down below the vertical mid-point. From an apparatus standpoint, suspension roasting of the type discussed is characterized, according to the prior art, by use of burners comprising a steel shell lined with multiple thicknesses of refractory firebrick. Practice shows that commercial refractories of even top quality, when utilized in suspension roasting, are initially or eventually become appreciably permeable with regard to the corrosive gases existing in the roasting zone. This factor and the existence of appreciable plus pressures in the roasting zone effect outward gas seepage which leads to corrosion of the outer steel shell which heretofore has always been in direct contact with the outer faces of the refractory lining. Such condition results in shell deterioration and resultant gas leaks to the atmosphere. In prior burner construction, sidewise support of refractory wall is dependent largely upon cementitious adherence to the steel shell. Further, incremental units of the refractory walls depend for basal support on underlying brick, and this arrangement, because of relatively low crushing strength of refractories, is a limitation on the height of the roasting zone. Additionally, in order to afford satisfactory overall strength and rigidity, this type of construction has been utilized commercially only in burners of circular horizontal cross-section, a mode of construction obviously expensive.

The present invention is based on the recognition of the existence of undesirable but unavoidable plus pressures in the roasting zone, and a major factor of the invention lies in the finding of procedure which prevents outward seepage of corrosive gas through the appreciably gas permeable refractories commercially available. Practice of this procedure constitutes the basis of substantial advances in this art. For example, prevention of outward seepage of corrosive gas avoids deterioration in any steelwork located outwardly of the outer faces of the refractory, which deterioration as is known in the art is caused by the presence in the gases of moisture and small amounts of $SO_3$. Once corrosion of metal outside the refractory walls can be positively prevented, entirely new aspects of burner wall design and construction may be utilized. Then it is made possible to employ, in suspension roasters, wall construction having none of the limitations of the prior art burners, and it is no longer necessary to restrict overall burner design to conform with the limitations imposed by the substantially self-supporting refractory walls of the prior art. The invention enables use of refractory wall construction by means of which incremental wall units of any desired size may be supported independently of other units of the wall, this factor alone making it feasible to build burners of height and cross-sectional area substantially greater than heretofore possible. Also, it is no longer necessary to follow the circular horizontal cross-section type of design. Hence, by completely eliminating existence of corrosion conditions outside of the refractory walls, the invention makes it possible to build, using commercially available gas permeable refractories, burners of any heights and horizontal cross-sectional configurations and areas, affording as major overall results greatly increased capacity per unit of apparatus and significant reduction of construction costs.

The foregoing advantages arise chiefly from the discovery of a process aspect which may be stated particularly as roasting the fines while in gaseous suspension and under conditions in which positive pressure exists in at least an appreciable portion of the roasting zone, carrying out roasting in the combustion zone formed on sides and top by walls of non-metallic refractory material which under roasting conditions is appreciably gas permeable, and maintaining, at pressure appreciably higher than any pressure existing in the combustion zone, a confined non-corrosive gas blanket over the total area of and in direct physical contact with and entirely enveloping the refractory outer faces of substantially all those portions of such sides and top of at least those roasting chamber plus pressure zones which are oriented toward the atmosphere.

The invention, while applicable to roasting of metal sulfide ore such as iron pyrites, pyrrhotite, zinc sulfide or arsenopyrite, for convenience may be described in connection with the suspension roasting of iron pyrites. Typical suitable raw sulfide may consist of finely ground iron pyrites, e. g. flotation concentrates, in which instance the material is generally finer than about 300 mesh. Another example consists of massive pyrrhotite ore, dry ground and air-classified to form a product containing say 3–5% coarser than 65 mesh and about 70–75% finer than 200 mesh. In this specification and appended claims the term "fines" designates material of such degree of subdivision as may be roasted while suspended in an oxidizing gas.

A supply of sulfide fines is maintained in bin 174 (Fig. 5) by suitable mechanism not shown. Before roasting is begun, combustion chamber 20 is preheated to temperature above the ignition point of the particular ore to be roasted as by use of oil burners inserted thru work holes not shown. After furnace preheating, blower 130, main suction fan 230 e. g. of a sulfuric acid plant, blowers 142 (Fig. 1), fines conveyer 175, and fines blower 176 (Fig. 5) are put in operation, following which primary combustion supporting air is drawn into the combustion chamber 20 thru air inlet-cinder outlet ports 23, fines drop into conduit 177, are picked up by the air stream (tertiary air) from blower 176 and carried along through conduit 177 into the injector tube 167 of Fig. 5. It will be understood that each of the five injectors indicated on Fig. 3 includes an injector tube 167 and that each tube may be supplied from bin 174 through conduits not shown but similar to conduit 177. As indicated in Fig. 5, the outlet ends of the four side injectors are located inside the combustion chamber at a horizon somewhat above the lower ends of the vertical walls of the burner, while as shown in Fig. 1 the outlet end of the center injector is preferably at a level corresponding with the upper edges of the cinder hearths. The vertical position of the outlet end of center injector may be regulated by axial adjustment, and the vertical and horizontal directions of the axes of the side injectors may be adjusted by means of the ball joints in flanges 170 which carry the side injectors. Blowers 130 and 142 supply secondary combustion air which enters the combustion zone, through the annular sleeves 169, in annular streams which envelop the fines-air currents at their points of introduction into the combustion chamber. Further functions of the positive pressure air furnished by blowers 130 and 142 will appear.

Operation of fines conveyer 175, fines blower 176 and its associated valve are adjusted so that fairly average fines particles, particularly from the side injectors, rise upwardly thru the combustion zone to a point approaching the combustion chamber crown before falling back toward the cinder hearth. The longitudinal axes of the side injectors are directed so that there is substantially no direct impingement of fines on the chamber walls, and this objective may be obtained by adjusting injector axes so that imaginary extensions of such axes into the combustion chamber converge at a level just below the lower edge of the breach in top of fire wall 24. Of the total quantity of air needed to support fines oxidation, preferably only a minor portion is utilized as tertiary air to inject the fines, the major portion of air being drawn in as primary air thru the air inlet-cinder outlet ports 23. The amount of air charged in by way of the fines injectors and blower 176 should not be more than about 25% by volume of the total and is usually about 20% or appreciably less. By having the open areas of ports 23 sufficiently large, as by adjustment of the slide gates thereon, and by setting proper operating rates for blowers 130 and 142, and restricting to an operating minimum the total amount of air fed into the combustion chamber with the fines thru the injectors, it is possible to utilize main suction fan 230 as the major factor of control to minimize the total volume of air brought into the combustion chamber and correspondingly increase $SO_2$ strength of the combustion gas. Operation of the fan and blowers, and adjustment of the open areas of ports 23 are correlated so as to supply sufficient oxygen to effect substantially complete fines oxidation and so that primary and secondary air enter the lower end of the combustion chamber at a velocity less than the initial velocity of the fines, and so that the overall velocity of the stream of total air passing only upwardly thru the roasting zone is not sufficient to interfere with the free gravity fall of the fines and cinder. Another important factor contributing to the overall satisfactory results is that the secondary air utilized for roasting and charged in through annular passages 169 enters the combustion chamber in streams surrounding the fines-air suspensions discharged from the injectors. Such introduction of secondary roasting air, which may amount to e. g. 25–35% of the total air used, serves to guide travel of fines and to minimize contact of same with the chamber walls, and also in conjunction with incoming primary air creates in the bottom of the combustion zone a strongly oxidizing atmosphere and provides an evenly dispersed, non-turbulent current of oxidizing gas rising throughout the length of the combustion chamber.

Ignition of fines takes place almost immediately upon discharge from injectors. Since the atmosphere in the bottom of the combustion zone is strongly oxidizing, roasting proceeds rapidly. Locally, temperatures may be as high as 2200–2400° F. Because of the mode of introduction of the fines and of the primary and secondary air utilized for combustion, solid particles rise to an elevation short of crown 82 and there is formed a relatively uniform dispersion of solids over a major portion of the upper end of the combustion chamber. Thereafter the particles settle toward the hearths in a more or less straight line at a rate substantially as induced by gravity. In this manner the fines are caused to pass over an extended trajectory comprising substantially the longest possible path of travel considering the proportions of the combustion chamber. During the latter part of the upward travel of fines, the rate of vertical movement rapidly decreases to zero, and during the initial part of the descent of the fines the rate of downward movement of the fines is relatively small. Hence while passing upwardly and downwardly thru the upper section of the combustion chamber, the average rate of movement of fines is slow and this slow rate of travel increases the time the particles are in the roasting atmosphere thereby giving a relatively long time for roasting to proceed.

The $SO_2$ gas produced exits from the top of the combustion chamber through breach 27, flows downwardly thru boiler section 18 to conduit 32 and line 233, and then into dust collectors 234. If to be used for manufacture of sulfuric acid, the gas stream is passed thru wet purification and drying system 235 to the suction side of fan 230, the pressure side of which discharges the gas to contact units for catalytic oxidation of the $SO_2$ to $SO_3$.

It will be seen that, generally speaking, gas movement thru the system up to the inlet side of fan 230 is indeed by the suction effected thereby. Under optimum conditions of operation, assuming proper but relatively fixed adjustment of blowers 130, 142 and 176, main fan 230 is regulated so that pressure at air inlet-cinder outlet ports 23 at the bottom of the combustion zone is just slightly negative in order to avoid presence of excess oxidizing gas in the burner and accompanying dilution of the product gas. However, in a commercial operation, pressures at ports 23 may vary from the slightly negative optimum to practically balanced pressure, the negative pressure being as much as 0.25 inch of water. Practice shows that, even though pressures at ports 23 are as noted and the system as a whole is under negative pressure induced by fan 230, because of inherent characteristics of this type of suspension roasting, positive pressures as high as 0.25 inch or well above may develop in the upper half of the combustion chamber and also in the upper part of boiler section 18. These plus pressures give rise to the operating difficulties noted. In accordance with the invention, it has been found that these disadvantages may be overcome if there is maintained, on the outside surfaces of all refractory walls and roof portions which are subjected to internal plus pressures and oriented toward the atmosphere, a confined non-corrosive gas blanket at a pressure appreciably higher than any pressure existing in the combustion zone. It will be noted that vertical walls 11–14 and roof sections 16 and 17 are oriented toward the atmosphere while fire-wall 24 is not so arranged.

The gas blanket may be composed of any gas not corrosive to metal, but for practical reasons air is used for this purpose. In the embodiment illustrated, plus pressure gas blanket maintenance is effected by the provision of gas spaces 118 and 119 which completely envelop the sides and top of the entire structure, and by the forcing of air into these spaces from the atmosphere by means of blowers 130 and 142 (Fig. 1). It will be apparent from previous apparatus description that air is forced under positive pressure by blower 130 thru conduit 132 into the lower end of the gas space which surrounds the side and back walls of the boiler section. This air flows upwardly, and passes from the top of such space thru pipes 137 and 138 (Fig. 4) at the top of the structure into the chamber 140 which communicates with the inlet sides of the blowers 142 and with the atmosphere thru inlet 145. Blowers 142 are ordinarily regulated so as to draw in from the atmosphere about twice the quantity of air forced into the base of the boiler section envelope by blower 130. The plus air pressure at the outlet side of blower 130 may be about one inch or more of water depending upon particular operating conditions. Blowers 142 about triple the total volume of blanket air and supply same to conduit 150 and distributing chamber 151 (Fig. 1) at positive pressure which in representative operations may be about one inch of water or appreciably higher. In any event, blowers 130 and 142 are adjusted so that the positive pressure existing in all parts of the gas spaces 119 and 118 in direct contact with the atmospherically oriented tops and sides of the combustion chamber and of the boiler section is appreciably, say 0.25 inch of water, in excess of the maximum plus pressure developing in the top of the structure, the degree of the latter pressure being determined from experience with the particular burner unit employed. The air from distributing chamber 151 flows downwardly over the combustion chamber crown 82, and downwardly thru the gas space which envelops those sides of the combustion zone which are oriented toward the atmosphere. This downflow of blanket gas is countercurrent to gas flow in the combustion chamber, and affords the advantage that the blanket air is coolest at the top where combustion zone gas is at high temperature and ordinarily heat extraction therefrom is desirable. If desired, the blanket gas may be discharged to the atmosphere from the bottom of space 118. However, preferably as in the embodiment illustrated, the blanket air, which may be at temperature of 300–450° F., flows thru pipes 155, 156 and 157 (Fig. 3) into the annular spaces 169 surrounding the injector tubes 167, and thence into the combustion chamber for use therein as secondary air.

In the combustion chamber, the secondary air fulfills a twofold function, namely, to supply a minor but substantial amount of the oxygen needed for roasting, and more importantly to facilitate control of introduction of fines into the bottom of the roasting zone. When the secondary air is fed into the combustion chamber, in the preferred manner described, such air forms an enveloping sleeve for the incoming fines-air stream and, in addition to affording high oxygen concentration in the immediate vicinity of the incoming fines, serves to initially guide the fines in such a way as to prevent too wide fines dispersion which would be conducive to creating excessive turbulent conditions in the bottom of the combustion chamber and to causing direct contact of fines particles with the hot burner walls resulting in scarring of the latter as known in this art.

In a representative operation in which it is sought to maintain a slightly negative pressure at ports 23, blowers 130 and 142 are adjusted so that the plus pressure of the secondary air in pipes 155, 156 and 157 is of the order of 0.25–0.5 inch of water. Because of the minor amount of secondary air introduced into the combustion chamber, plus pressures of this nature, and no higher than needed to maintain the desired plus pressure in the gas spaces, do not significantly upset the generally existing negative pressures in the lower end of the combustion zone.

In the type of roasting operation described, temperature control in the combustion zone is a factor of major importance. This is particularly true in the upper end of the combustion zone where some fines particles are in a sintered or semi-plastic condition. In the absence of adequate temperature control, in some circumstances large accretions of partly roasted fines are likely to form on the combustion zone walls thus resulting in the known operating difficulties caused by excessive scarring. In accordance with another aspect of the invention, temperature control particularly in the upper end of the combustion zone is effected by indirect transfer of heat to water which is circulated thru downcomers 204, headers 200 and 201, and the risers 203 which, as described, in effect line the inside of the upper ends of the vertical combustion chamber walls and the underside of crown 82. The heat picked up by the water in risers 203 is transferred to water-steam drum 180.

Since in any particular burner, the quantity of water which can be circulated thru the risers 203 is fairly fixed, the invention also affords further temperature control for the upper end of the combustion chamber by providing for recirculation therethrough of readily controllable quantities of partly cooled product gas. For example, SO₂ gas may exit dust collectors 234 at temperatures of say 600–800° C., and by regulation of a booster blower 240 in gas line 209, controlled quantities of relatively cool SO₂ gas may be recirculated back into about the midpoint of the combustion zone as shown in Fig. 1. Thus, by the combination of heat removal from the top of the combustion zone by indirect heat transfer to water, and permissible recirculation of cooled product gas by blower 240, it is possible to provide markedly effective and flexible temperature control in the roasting zone. In a typical operation, average temperatures at about the vertical midpoint of the roasting zone may be about 1800–2000° F., and temperatures of the gas exiting thru breach 27 into boiler section 18 may be of the order of 1650–1800° F.

Figure 15:
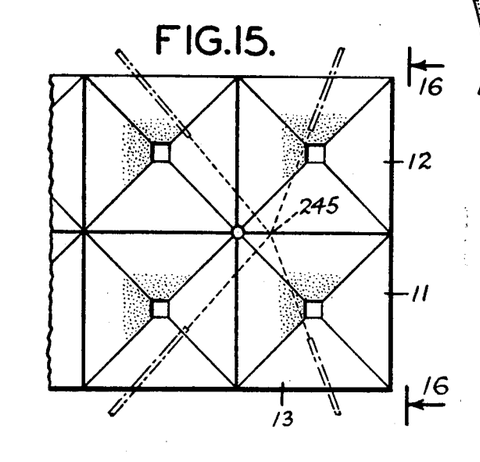
Fig. 15 is a diagrammatic plan view of a modified arrangement of ore injectors.
Figure 16:
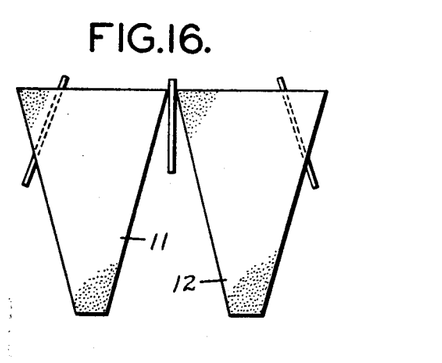
Fig. 16 is a diagrammatic elevation taken on line 16—16 of Fig. 15.

An advantage afforded by the invention is construction and utilization of roasting chambers of rectangular cross-section. When operating with a burner of this nature, it has been found advantageous to inject the fines in the manner diagrammatically illustrated in Figs. 15 and 16. In this situation, the longitudinal axes of the side injectors may be adjusted so that imaginary axial extension lines substantially converge at a point 245 (Fig. 15) which in plan is located between the vertical center of the combustion chamber and the front wall 11, and in elevation is located at a level slightly below the upper edge 26 of the firewall 24. It has been found that this arrangement of side injectors effects trajectories of the major portion of the fines fed into the combustion chamber such that scarring of the combustion chamber walls is minimized, and overall roasting is improved apparently because a greater proportion of fines is held in the combustion zone and the quantity of fines swept thru breach 27 into the boiler section 18 is materially reduced. Further, when operating in accordance with the manner illustrated in Fig. 15, it is desirable to locate the side injectors in the sloping walls of the cinder hearths as illustrated in Fig. 16. In this circumstance, fines from the side injectors are introduced into the combustion chamber at points more distant from adjacent the vertical chamber walls, and at a higher angle which contributes to lengthening of trajectory and avoidance of direct contact of fines with the chamber walls.

In one practical example of operation of the process of the invention, the combustion chamber was substantially square in horizontal cross-section with a side dimension of about 22 feet and an overall vertical dimension from the ports 23 to crown 82 of roughly 56 feet. The fines employed were pyrites flotation concentrates containing about 48% sulfur by weight and having a particle size distribution approximately as follows: 1% on 65 mesh; 9% thru 65 and on 100; 5% thru 100 on 200; 5% thru 200 on 325, and 80% thru 325. A blower such as 176 was driven to create an air pressure of about 15 inches of water in conduits 177 thru each of which about 1000 cubic feet per minute of air were charged into the combustion zone as tertiary air along with the fines. The main suction fan 230 produced at the ports 23 a minus pressure sometimes approaching about balance but averaging about minus 0.25 inch of water. About 13,000 cubic feet per minute of air were drawn in thru ports 23 as primary air. From time to time over a substantial period of operation, plus pressures sometimes as high as one inch of water were developed in the upper ends of the combustion zone and boiler section. Blowers 130 and 142 together supplied about 8000 cubic feet per minute of blanket air which at the tops and upper sides of the combustion zone and boiler section was maintained at plus pressure of about 1.25 inches of water and which in pipes 155, 156 and 157 (Fig. 3) had temperature of about 400° F. and a plus pressure of about 0.25 inch of water. Temperatures at about the vertical mid-point of the roasting zone averaged about 1800° F., and temperatures at the breach 27 averaged about 1650° F. Water was circulated thru risers 203, but no recycling of cool product gas was employed. The $SO_2$ gas contained about 12% $SO_2$ and was discharged from the bottom of the boiler section into line 233 at temperature of about 690° F. Of the total recoverable cinder about 20% was discharged thru ports 23, about 35% was withdrawn from hopper bottoms 29 of the boiler section, and about 45% was recovered from the hoppers of dust collectors 234, Fig. 1. The total composite cinder discharged from the process averaged about 1.2% sulfur, and sulfide fines input to the furnace was about 390 tons per 24 hours.

The burner design and structural advantages afforded by the gas blanket concept are readily apparent. Thus the combustion chamber and the boiler unit may be combined in a unitary structure which affords reduction of construction costs, temperature control in the combustion chamber and increased waste heat recovery. Of major importance is the fact that any gas seepage through the refractory walls is inwardly directed air and because there are no corrosive gases leaking outwardly thru the outer refractory confines of the combustion zone and boiler section, any quantities and types of steelwork may be used immediately outside the refractory walls without danger of corrosion. This latter factor permits accomplishment of the structure described in which it may be considered that any or all incremental units of the refractory side walls and crowns may be independently supported from steelwork, this feature alone making it possible to increase the overall size and capacity of a burner unit to greatly beyond anything of the prior art. As used herein the expression "incremental unit" does not necessarily mean a single refractory brick, but is intended to include e. g. a single brick, or a series of bricks or a portion of wall or roof of any size which is structurally feasible. Additionally, since the walls and crowns are wholly independently supported, there is afforded the opportunity of independently supporting the cinder hearths and connecting the latter to the lower edges of the vertical walls by joints which in effect are only seals. The latter is of particular importance since, in suspension roasting operations, as a result of unavoidably irregular operating conditions accretions weighing several hundred pounds may drop off the combustion chamber walls and tear out the cinder hearths along with substantial portions of the lower ends of the vertical walls, thus requiring major reconstruction. In the present burner, heavy damage to cinder hearths merely breaks the joint described in connection with Fig. 10 and does no damage whatsoever to the independently supported vertical walls.

I claim:

1. An apparatus for roasting metal sulfide fines comprising a combustion chamber having a crown and vertical side walls formed of non-metallic refractory material which is appreciably gas permeable under conditions of operation, means adjacent the lower end of said chamber for injecting an upwardly directed stream of fines into said chamber, and means for introducing oxidizing gas into the bottom of said chamber and passing such gas upwardly through said chamber; a cage-like supporting framework substantially spaced outwardly of and surrounding said crown and walls, means for independently supporting by said framework substantially each incremental part of those portions of said crown and walls which are immediately adjacent said framework so that such portions are suspension-supported by said framework, a gas tight shell carried by said framework and positioned outwardly from said crown and walls a distance sufficient to provide a gas space of substantial lateral dimension and bounded by the inner surface of the shell and by the refractory outer faces of said crown and walls, said gas space completely enveloping the refractory outer faces of substantially all those portions of said side walls and crown which are oriented toward said framework, means for withdrawing sulfur dioxide gas from the top of said chamber, and means for discharging cinder from the bottom of said chamber.

2. An apparatus for roasting comminuted metal sulfide ore comprising a combustion chamber having a crown and vertical side walls formed of non-metallic refractory material which is appreciably gas permeable under conditions of operation, means for introducing sulfide ore into said chamber, and means for introducing oxidizing gas into said chamber to support roasting; a cage-like supporting framework substantially spaced outwardly of and surrounding said crown and walls, means each for independently supporting by said framework substantially each incremental part of those portions of said walls and crown which are immediately adjacent said framework so that such portions are suspension-supported by said framework, a gas tight shell carried by said framework and positioned outwardly from said crown and walls a distance sufficient to provide a gas space of substantial lateral dimension and bounded by the inner surface of the shell and by the refractory outer faces of said crown and walls, said gas space completely enveloping the refractory outer faces of substantially all those portions of said side walls and crown which are oriented toward said framework, means for withdrawing sulfur dioxide gas from said chamber, and means for discharging cinder therefrom.

3. An apparatus for roasting metal sulfide fines comprising a combustion chamber having a crown and vertical side walls formed of non-metallic refractory material which is appreciably gas permeable under conditions of operation, means adjacent the lower end of said chamber for injecting an upwardly directed stream of fines into said chamber, and means for introducing into the bottom of said chamber oxidizing gas in quantity to supply the major portion of oxygen needed for roasting and passing such gas upwardly through said chamber; a cage-like supporting framework substantially spaced outwardly of and surrounding said crown and walls, means for independently supporting by said framework substantially each incremental part of those portions of said crown and walls which are immediately adjacent said framework so that such portions are suspension-supported by said framework, a gas tight shell carried by said framework and positioned outwardly from said crown and walls a distance sufficient to provide a gas space of substantial lateral dimension and bounded by the inner surface of the shell and by the refractory outer faces of said crown and walls, said gas space completely enveloping the refractory outer faces of substantially all those portions of said side walls and crown which are oriented toward said framework, means for flowing gas under positive pressure through said space and then into the bottom of said chamber, means for withdrawing sulfur dioxide gas from the top of said chamber, and means for discharging cinder from the bottom of said chamber.

4. The apparatus of claim 3 which includes means for flowing gas under positive pressure downwardly through said gas space countercurrent to gas flow in the combustion chamber.

5. The apparatus of claim 3 which includes heat exchange means adjacent the underside of said crown and adjacent the inside of at least the upper portion of said walls for abstracting heat from the upper end of said chamber.

6. An apparatus for roasting comminuted metal sulfide ore comprising a combustion chamber having a crown and vertical side walls formed of refractory material, means for introducing sulfide ore into said chamber, and means for introducing oxidizing gas into said chamber to support roasting; a cage-like supporting framework outwardly of and surrounding said crown and walls, means for independently supporting by said framework substantially each incremental part of those portions of said crown and walls which are immediately adjacent said framework so that such portions are suspension-supported by said framework, means for withdrawing sulfur dioxide gas from said chamber, a cinder hearth at the bottom of said chamber and having the periphery thereof adjacent but separated from the periphery of the lower ends of said walls, means independent of said framework for supporting said hearth, means for forming a gas-tight joint between said peripheries, and means for discharging cinder from said hearth.

7. An apparatus for roasting metal sulfide fines comprising a combustion chamber having a crown and vertical side walls formed of non-metallic refractory material which is appreciably gas permeable under conditions of operation, means adjacent the lower end of said chamber for injecting an upwardly directed stream of sulfide fines into said chamber, and means for introducing oxidizing gas into the bottom of said chamber and passing such gas upwardly through said chamber; a cage-like supporting framework substantially spaced outwardly of and surrounding said crown and walls, means for independently supporting by said framework substantially each incremental part of those portions of said crown and walls which are immediately adjacent said framework so that such portions are suspension-supported thereby, a gas tight shell carried by said framework and positioned outwardly from said crown and walls a distance sufficient to provide a gas space of substantial lateral dimension and bounded by the inner surface of the shell and by the refractory outer faces of said crown and walls, said gas space completely enveloping the refractory outer faces of substantially all those portions of said side walls and crown which are oriented toward said framework, means for withdrawing sulfur dioxide gas from the top of said chamber, a hopper-bottom cinder hearth for said chamber terminating in a discharge port and having the upper periphery thereof adjacent but separated from the lower periphery of said walls, means independent of said framework for supporting said hearth, and a gas-tight refractory joint having no substantial inherent structural strength between said peripheries.

8. An apparatus for roasting metal sulfide fines comprising a combustion chamber and a communicating and contiguously associated heat exchange section each having a crown and vertical side walls formed of non-metallic refractory material which is gas permeable under conditions of operation, means adjacent the lower end of said chamber for injecting an upwardly directed stream of sulfide fines into said chamber, and means for introducing oxidizing gas into the bottom of said chamber and passing such gas upwardly to support fines oxidation; a cage-like supporting framework substantially spaced outwardly of and surrounding said crown and walls, means for independently supporting by said framework substantially each incremental part of those portions of said crown and walls which are immediately adjacent said framework so that such portions are suspension-supported thereby, a gas tight shell carried by said framework and positioned outwardly from said crown and walls a distance sufficient to provide a gas space of substantial lateral dimension and bounded by the inner surface of the shell and by the refractory outer faces of said crown and walls, said gas space completely enveloping the refractory outer faces of substantially all those portions of said side walls and crown which are oriented toward said framework, means for withdrawing sulfur dioxide gas from the top of said chamber and passing such gas through said section and extracting heat from such gas therein, and means for discharging cinder from the bottom of said chamber.

9. The apparatus of claim 8 which includes means for flowing gas under positive pressure first upwardly over the side walls and crown of said heat exchange section, then downwardly over the crown and side walls of said chamber, and then into the base portion of said chamber.

10. The apparatus of claim 8 which includes water tube heat exchange means in said section, and water tube heat exchange means adjacent the underside of said chamber crown and adjacent the inside of at least the upper portion of said chamber side walls.

References Cited in the file of this patent

UNITED STATES PATENTS

| | | |
|---|---|---|
| 2,575,885 | Mittendorf | Nov. 20, 1951 |
| 2,649,846 | Hosbein | Aug. 25, 1953 |
| 2,667,941 | Ekstrom, Jr. | Feb. 2, 1954 |

FOREIGN PATENTS

| | | |
|---|---|---|
| 939,744 | France | Nov. 23, 1948 |